3,685,974
Patented Aug. 22, 1972

3,685,974
PROCESS FOR THE PREPARATION OF PHOSPHORYL TRIAMIDE
Michael A. Silvestri, Cranston, R.I., assignor to Sun Chemical Corporation, New York, N.Y.
No Drawing. Filed May 28, 1970, Ser. No. 41,633
Int. Cl. C01b 25/00; C09d 5/18
U.S. Cl. 423—302  3 Claims

ABSTRACT OF THE DISCLOSURE

Flame-retardant compositions are prepared by reacting phosphoryl chloride with ammonia in an aqueous system.

---

This invention relates to flame-retardant compositions. More specifically it relates to a novel process for preparing phosphoryl chloride-ammonia reaction products.

As used hereinafter, a "flame-retardant" composition is one which treats a material so that it is resistant to the propagation of a flame across its surface after the igniting flame has been removed. It is known that phosphoryl triamide, a reaction product of phosphoryl chloride and ammonia, has a fire-retarding effect on cellulosics, such as fibers, fabrics, wood, paper, and the like. In the past phosphoryl triamide has been made by reacting phosphoryl chloride with anhydrous ammonia in a solvent system, as described in, for example, Mellor's "Comprehensive Treatise on Organic and Theoretical Chemistry," v. 8:713 (1928) and U.S. Patents 2,596,935–9; 2,642,405; 2,661,264; 2,661,311; 2,661,342; 2,680,077; and 2,782,-133. The resulting precipitate of phosphoryl triamide and ammonium chloride is collected by filtration and dried. Such a system has many disadvantages, important among which is the necessity for using solvents, such as carbon tetrachloride, kerosene, naphtha, hexane, benzene, acetone, and the like; the process is dangerous as well as expensive. Furthermore, the process requires the expensive and time-consuming steps of filtering to collect the product and subsequently drying the solids and recovering the solvent.

It has now been found that the reaction of phosphoryl chloride and ammonia can be carried out in an aqueous system, thus eliminating the need to isolate the product as a crystalline solid as well as avoiding the air pollution, fire hazards, odor, and so forth that accompany the use of volatile solvents.

In general the process comprises adding phosphoryl chloride to a mixture of water and aqueous ammonia at a temperature below about 20° C., resulting in an aqueous solution of phosphoryl triamide and ammonium chloride, according to the following:

$$POCl_3 + 6NH_3 \rightarrow PO(NH_2)_3 + 3NH_4Cl$$

It is important that the phosphoryl chloride be added to aqueous ammonia, rather than having the ammonia added to the phosphoryl chloride as in the known non-aqueous system, in order to insure the presence of an excess of ammonia to react with the phosphoryl chloride. This reduces to a minimum the probability that the water present in the system will hydrolyze the phosphoryl chloride.

The temperature at which the reaction takes place may be varied over a wide range of from about −20 to 50, and preferably about 0 to 10° C. In order to obtain phosphoryl triamide, the reaction temperature must be below 20° C. At a temperature above 20° C. the resulting product is a water-soluble nitrogen-phosphorus-containing composition, not yet identified, whose flame-retardant properties are similar to those of phosphoryl triamide. At exactly 20° C. apparently phosphoryl triamide is formed to a major extent, but traces of the unidentified nitrogen-phosphorus composition begin to appear.

The reactants are preferably used in stoichiometric amounts, and the amount of water that is employed is that which is required to insure that the final solids are below about 40 percent in order not to exceed the solubility limits. The reaction will occur, however, when the ratio of the amounts of ammonia to phosphoryl chloride ranges from about 6 to 1:18 to 1 moles.

In order to avoid vapor phase reaction in the zone above the liquid in the reaction vessel, the phosphoryl chloride desirably is admitted to the ammonia by subsurface delivery means.

The pH of the products of this invention is preferably, but not necessarily, between about 7.0 and 9.0, the stability of the solution being best in this range. Furthermore, too high a pH gives an excessive ammoniacal odor to the products.

As set forth above, the reaction for the formation of phosphoryl triamide is:

(I) $POCl_3 + 6NH_3 \rightarrow PO(NH_2)_3 + 3NH_4Cl$

In a non-reactive solvent medium the only likely complication is the formation of some poly-phosphoramide, as:

(II) $nPO(NH_2)_3 \rightarrow [PO(NH_2)_2]_{n-1} NHPO(NH_2)_2 + n-1 NH_3$

On the other hand, in the aqueous system there are theoretically many possible by-products, such as the products of hydrolysis of phosphoryl chloride:

(III) $POCl_3 + 3H_2O \rightarrow H_3PO_4 + 3HCl$

In the presence of ammonia, these would exist as the ammonium salts $(NH_4)_2HPO_4$, $(NH_4)H_2PO_4$, and $NH_4Cl$. In aqueous solutions, reaction II above could also occur. Additionally, the phosphoryl triamide could hydrolyze to such products as $PO(NH_2)_2OH$, $PO(NH_2)(OH)_2$, $PO(NH_2)_2ONH_4$, $PO(NH_2)(ONH_4)_2$, and the like.

It is an unexpected feature of the process of this invention that these undesired by-products are not formed in any appreciable quantity, the main reaction being that of I above for this aqueous system.

In view of the fact that phosphoryl chloride hydrolyses in air, let alone in water, and phosphoryl triamide has been considered unstable in solution, it is also unexpected that phosphoryl triamide can be prepared in good yield in an aqueous solution. The solubility of the material, however, does prevent the manufacture of highly concentrated solutions, that is, above about 40 percent solids.

The products of the process of this invention are as effective as those prepared under anhydrous conditions in imparting flame-retardancy to a wide variety of cellulosic materials, such as wood; paper; fabrics, e.g., cellulosic textiles, rayon, polyester-cotton blends, polyester-rayon blends, etc.; and the like. In addition, by preparing them in an aqueous system rather than in a solvent system, the filtering, drying, and solvent recovery operations and the hazards related to the use of solvents have been eliminated.

The products of this invention may be applied to the substrate as aqueous solutions in any known and convenient manner, e.g., by padding, immersion, or spraying.

These compounds may be applied per se to the substrate or they may be combined with any of a variety of known modifiers, such as for example, chlorinated rubber, chlorinated paraffins, nitrogen-containing resins, alkyd resins, polyhydroxy compounds, antimony oxide, and the like, in conventional amounts.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE 1

(A) To a closed reaction vessel equipped with a reflux condenser, a temperature recorder, and a sub-surface delivery tube were charged 6 moles (352 parts) of 26° Bé. aqueous ammonia and 550 parts of water. The resulting solution was cooled to 0° C. One mole (153.5 parts) of phosphoryl chloride was added slowly through the sub-surface delivery tube. The temperature was maintained below 20° C. by external cooling and by the rate of addition of the phosphoryl chloride. When the addition was complete, the pH of the solution was adjusted to about 7.0.

The resulting nitrogen-phosphorus product was phosphoryl triamide, identified by infra-red spectra.

(B) Cotton fabric, which had been washed and dried, was dipped into the resulting aqueous solution of phosphoryl triamide containing 15 percent by weight of solids, prepared in part (A). The treated fabric was then dried for 3 minutes at 320° F.; the resulting treated material was subjected to accepted testing procedures for determining flame-retardancy. (AATCC vertical test method 34—1966 and AATCC test method 33—1962.) It slowed down the rate of burning, and the fabric had no flame or after-glow when a heat source, such as the flame of a candle or a Bunsen burner, was removed from contact with the treated fabric.

EXAMPLE 2

The procedure of Example 1(B) was repeated with each of the following substrates instead of cotton fabric: rayon; a polyester-cotton blend; a polyester-rayon blend; other blends containing a major amount of a cellulosic material; paper; and wood. The results were comparable.

EXAMPLE 3

The procedure of Example 1(A) was repeated except that the phosphoryl chloride was added to the aqueous ammonia at 40° C. The product, an aqueous solution of a nitrogen-phosphorus composition not yet identified, was tested as in Examples 1(B) and 2 and found to have flame-retardant properties similar to the phosphoryl triamide prepared by the process of Example 1(A).

What is claimed is:

1. A process for the preparation of phosporyl triamide which comprises adding phosphoryl chloride to aqueous ammonia at about —20 to 20° C., the ratio of the amount of ammonia to phosphoryl chloride ranging from about 6 to 1:18 to 1 moles, in the presence of an amount of water sufficient to give a product containing less than 40 percent by weight of solids.

2. The process of claim 1 where the temperature is about 0 to 10° C.

3. The process of claim 1 where the phosphoryl chloride and the ammonia are reacted in stoichiometric amounts.

References Cited

UNITED STATES PATENTS

| | | | |
|---|---|---|---|
| 2,661,264 | 12/1953 | Malowan | 23—357 |
| 2,749,233 | 6/1956 | Malowan | 23—357 |

FOREIGN PATENTS

| | | | |
|---|---|---|---|
| 770,789 | 3/1957 | Great Britain | 23—357 |

OSCAR R. VERTIZ, Primary Examiner

H. S. MILLER, Assistant Examiner

U.S. Cl. X.R.

106—15 FP; 423—413